US010851022B2

(12) United States Patent
Deo et al.

(10) Patent No.: US 10,851,022 B2
(45) Date of Patent: Dec. 1, 2020

(54) AERATED COMPOSITE MATERIALS, METHODS OF PRODUCTION AND USES THEREOF

(71) Applicant: Solidia Technologies, Inc., Piscataway, NJ (US)

(72) Inventors: Omkar Deo, Piscataway, NJ (US); Vahit Atakan, West Windsor, NJ (US); Deepak Ravikumar, Piscataway, NJ (US); Xudong Hu, Monroe, NJ (US); Sadananda Sahu, Solon, OH (US); Surojit Gupta, Grand Forks, ND (US); Richard Riman, Belle Mead, NJ (US)

(73) Assignees: SOLIDIA TECHNOLOGIES, INC., Piscataway, NJ (US); RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 135 days.

(21) Appl. No.: 16/001,516

(22) Filed: Jun. 6, 2018

(65) Prior Publication Data
US 2019/0039960 A1 Feb. 7, 2019

Related U.S. Application Data

(63) Continuation of application No. 14/207,413, filed on Mar. 12, 2014, now abandoned.
(Continued)

(51) Int. Cl.
*C04B 38/02* (2006.01)

(52) U.S. Cl.
CPC ............... *C04B 38/02* (2013.01); *Y02P 40/18* (2015.11); *Y02P 40/615* (2015.11); *Y02W 30/92* (2015.05);
(Continued)

(58) Field of Classification Search
CPC .......... C04B 38/02; C04B 35/22; C04B 7/17; C04B 7/21; C04B 35/03; C04B 35/057;
(Continued)

(56) References Cited

U.S. PATENT DOCUMENTS

| 4,436,498 A | 3/1984 | Murray |
| 4,956,321 A | 9/1990 | Barrall |

(Continued)

FOREIGN PATENT DOCUMENTS

| JP | 2008-074648 | 4/2008 |
| WO | WO2009/102360 | 8/2009 |

(Continued)

OTHER PUBLICATIONS

PCT/US2014/024987, Intl Search Report of ISA, dated Aug. 14, 2014.
(Continued)

*Primary Examiner* — Stella K Yi
(74) *Attorney, Agent, or Firm* — Dentons US LLP

(57) ABSTRACT

The invention provides novel aerated composite materials that possess excellent physical and performance characteristics of aerated concretes, and methods of production and uses thereof. These composite materials can be readily produced from widely available, low cost raw materials by a process suitable for large-scale production with improved energy consumption, desirable carbon footprint and minimal environmental impact.

9 Claims, 7 Drawing Sheets

Related U.S. Application Data

(60) Provisional application No. 61/780,719, filed on Mar. 13, 2013.

(52) U.S. Cl.
    CPC ......... *Y02W 30/94* (2015.05); *Y10T 428/1314* (2015.01); *Y10T 428/24496* (2015.01); *Y10T 428/249921* (2015.04)

(58) Field of Classification Search
    CPC ............ C04B 2235/3208; C04B 14/04; C04B 14/062; C04B 14/4631; C04B 28/18; C04B 28/188; C04B 35/14; C04B 35/62807; C04B 35/62849; C04B 41/5035; C04B 41/68; B29C 41/04; B29C 41/16; B29C 41/18; B29C 44/40
    See application file for complete search history.

(56) References Cited

U.S. PATENT DOCUMENTS

| | | | |
|---|---|---|---|
| 5,631,097 | A | 5/1997 | Zambrzycki et al. |
| 8,114,367 | B2 | 2/2012 | Riman et al. |
| 2005/0284339 | A1 | 12/2005 | Brunton et al. |
| 2007/0062416 | A1 | 3/2007 | Brzuskiewicz et al. |
| 2009/0133361 | A1 | 5/2009 | Vera |
| 2009/0142578 | A1 | 6/2009 | Riman et al. |
| 2009/0143211 | A1 | 6/2009 | Riman et al. |
| 2010/0077691 | A1 | 4/2010 | Constantz et al. |
| 2010/0326328 | A1 | 12/2010 | Constantz et al. |
| 2011/0067600 | A1 | 3/2011 | Constantz et al. |
| 2011/0067605 | A1 | 3/2011 | Constantz et al. |
| 2011/0104469 | A1 | 5/2011 | Riman et al. |
| 2011/0129407 | A1 | 6/2011 | Riman et al. |
| 2011/0182799 | A1 | 7/2011 | Riman et al. |
| 2011/0203489 | A1 | 8/2011 | Constantz et al. |
| 2011/0290156 | A1 | 12/2011 | Constantz et al. |
| 2012/0312194 | A1 | 12/2012 | Riman et al. |
| 2013/0122267 | A1 | 5/2013 | Riman et al. |
| 2014/0127450 | A1 | 5/2014 | Riman et al. |
| 2014/0127458 | A1 | 5/2014 | Riman et al. |
| 2014/0342124 | A1 | 11/2014 | Riman et al. |

FOREIGN PATENT DOCUMENTS

| | | |
|---|---|---|
| WO | WO2012/122031 | 8/2009 |
| WO | WO2011/053598 | 5/2011 |
| WO | WO2011/090967 | 7/2011 |
| WO | WO2009/103885 | 1/2014 |
| WO | WO2014/159832 | 10/2014 |
| WO | WO2014/160168 | 10/2014 |
| WO | WO2014/165252 | 10/2014 |
| WO | WO2014/165257 | 10/2014 |
| WO | WO2014/197532 | 12/2014 |
| WO | WO2014/197545 | 12/2014 |
| WO | WO2015/051243 | 4/2015 |

OTHER PUBLICATIONS

PCT/US2014/025278, Intl Search Report of ISA, dated Aug. 14, 2014.

PCT/US2014/024996, Intl Search Report of ISA, dated Aug. 21, 2014.

PCT/US2014/025958, Intl Search Report of ISA, dated Sep. 4, 2014.

PCT/US2014/040816, Intl Search Report of ISA, dated Oct. 30, 2014.

PCT/US2014/040789, Intl Search Report of ISA, dated Sep. 30, 2014.

PCT/US2014/059024, Intl Search Report of ISA, dated Apr. 2, 2015.

Van Boggelen, "Safe Aluminum Dosing in AAC Plants", 2011, p. 45-50. *Included in "5th International Conference on Autoclaved Aerated Concrete", 2011.

Jahim, H.; "The Use of Wollastonite to Enhance Fresh and Mechanical Properties of Concrete", 1993, p. i-55.

The Engineering Toolbox, "Air Composition", 2006, p. 1-3; Accessed at http://web.archive.org/web/20060508170157/http://www.engineeringtoolbox.com/air-composition-d_212.html.

Mathey, R.; Rossiter, W.; "A Summary of the Manufacture, Uses, and Properties of Autoclaved Aerated Concrete", ASTM International, 1990, p. 15-37.

Desai, D.; "Development of Light Weight Concrete", Concrete Engineering Project Reports, 2011, p. 1-13, Accessed on Dec. 21, 2015 at http://web.archive.org/web/20120315002507/http://www.engineeringcivil.com/development-of-light-weight-concrete.html; *Publication date (2011) listed on p. 13.

FIG. 1
(a)
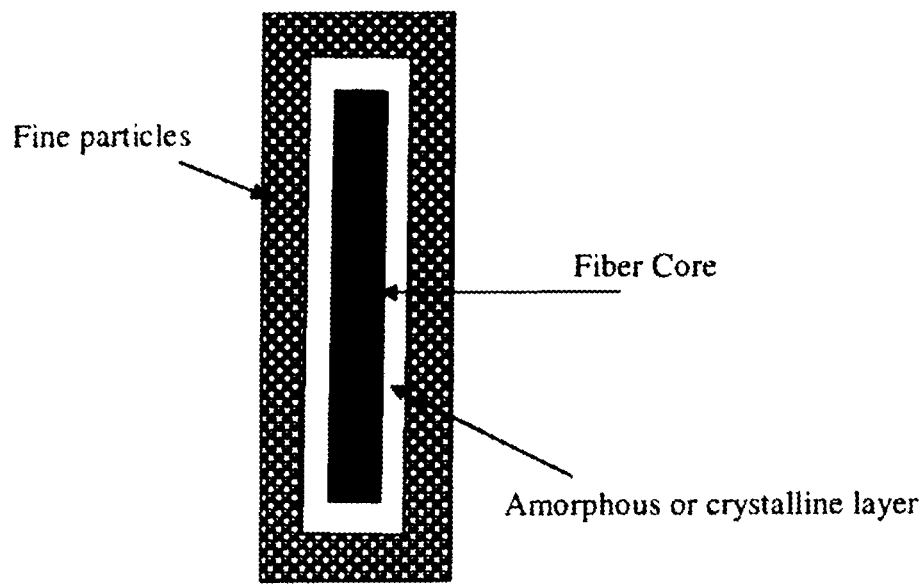
(b)
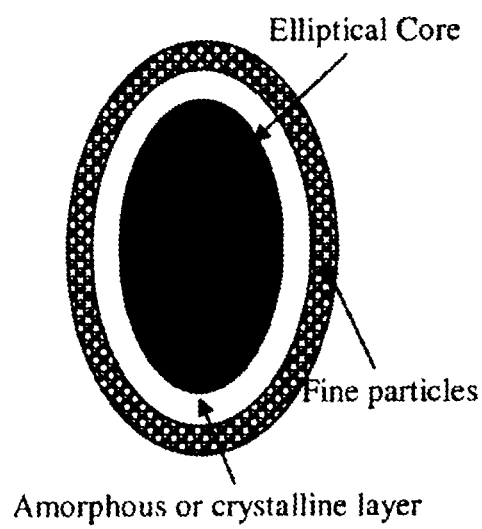
FIG. 1
(b)
(c)
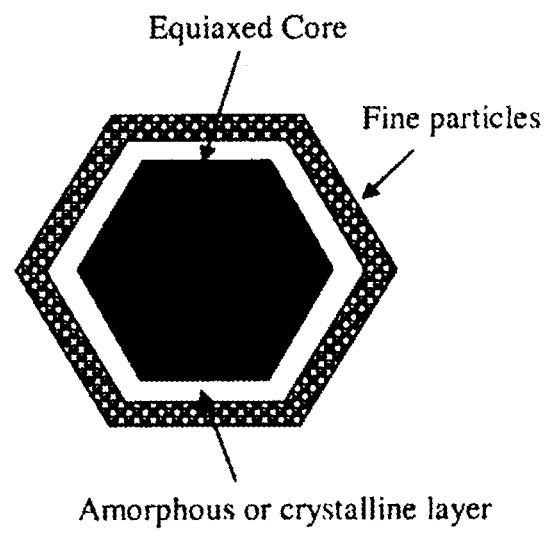
FIG. 1
(c)

(c)

Side View

Cross section (d)

Side View

Cross section (e)

(f)

Bonding Element

AERATED COMPOSITE MATERIALS, METHODS OF PRODUCTION AND USES THEREOF

PRIORITY CLAIMS AND RELATED PATENT APPLICATIONS

This application is continuation application of and claims priority to U.S. patent application Ser. No. 14/207,413, filed Mar. 12, 2014, which claims benefit of provisional Application No. 61/780,719 filed on Mar. 13, 2013, the contents of which are incorporated by reference in their entirety for all purposes as if fully set forth below.

FIELD OF THE INVENTION

The invention generally relates to aerated composite materials and aerated concretes. More particularly, the invention relates to novel aerated composite materials, and formulations and methods for their manufacture and uses. These aerated composite materials are suitable for a variety of applications in construction, fire resistance and insulation, landscaping, and infrastructure.

BACKGROUND OF THE INVENTION

Autoclaved aerated concrete is a type of lightweight, precast concrete that is formed under high temperatures and pressures using raw materials such as cement, fine aggregates such as sand or other filler materials, lime, water, and an aerating agent. The aerating agent causes air voids to form in the matrix and increase the porosity of the material, which is accompanied by an increase in the volume of the material along with a reduction in density.

Aerated concrete products offer a number of advantages over conventional concretes including their good strength, low weight, resistance to fire, corrosion, termite and mold, as well as good thermal insulation and sound deadening properties. Due to its lightweight and dimensional accuracy, aerated concretes can be assembled with minimal waste thereby reducing the need for additional equipment in construction and assembling. They offer high durability and require minimum maintenance. The lightweight of aerated concretes also help with lowering shipping costs.

Although favorable when compared to concretes, most conventional aerated concretes are prepared by processes that suffer from a number of deficiencies. The manufacture process of conventional aerated concretes involves special equipment, large energy consumption, and excessive carbon dioxide emission, leaving unfavorable carbon footprint. For example, aerated concretes are typically cured in autoclaves at temperatures ranging from 150° C. to 190° C. and at pressures ranging from 0.8 MPa to 1.2 MPa, to create a stable form of Tobermorite. Tobermorite is the primary binding element in aerated concrete. In addition, they are relatively expensive due to high finishing costs, difficulty to recycling, etc.

There is an on-going need for novel aerated composite materials that match or exceed the physical and performance characteristics of aerated concretes that can be mass-produced at lower cost with improved energy consumption and more desirable carbon footprint.

SUMMARY OF THE INVENTION

The invention is based in part on the unexpected discovery of novel aerated composite materials that possess excellent physical and performance characteristics of aerated concretes. These composite materials can be readily produced from widely available, low cost raw materials by a process suitable for large-scale production with reduced equipment need, improved energy consumption, and more desirable carbon footprint.

The formulation of aerated composite materials of the invention requires mostly readily available and low-cost materials that have minimal environmental impact. The raw materials include precursor materials such as particulate calcium silicate (e.g., ground wollastonite) that become bonding elements, and particulate filler materials (e.g., calcium oxide-containing material such as lime or xonotlite, lightweight aggregates such as perlite or vermiculite, or even industrial waste materials such as fly ash). In order to obtain a material that is highly porous, an aerating agent is used (e.g., an aluminum powder). A fluid component is also provided as a reaction medium, comprising liquid water and/or water vapor and a reagent, carbon dioxide ($CO_2$), which is consumed in the production as a reactive species and ends up sequestered in the final product. Depending on end user requirements, various other additives such as rheology modifying admixtures and coloring pigments can also be added to improve mixture consistency and flow.

Various additives can be used to fine-tune the physical appearance and mechanical properties of the resulting composite material, such as theology modifying admixtures and pigments. Additive materials can include natural or recycled materials, and calcium carbonate-rich and magnesium carbonate-rich materials, as well as additives to the fluid component, such as a water-soluble dispersant.

In addition, the aerated composite materials of the invention can be produced using the efficient gas-assisted hydrothermal liquid phase sintering (HLPS) process at low cost, less demanding equipment, and with much improved energy consumption and carbon footprint.

In one aspect, the invention generally relates to an aerated composite material. The aerated composite material includes: a plurality of bonding elements, a plurality of voids, and a plurality of filler particles having sizes of about 0.1 μm to about 1 mm. Each bonding element is comprised of: a core comprising primarily calcium silicate, a silica-rich first or inner layer, and a calcium carbonate-rich second or outer layer. The plurality of bonding elements and the plurality of filler particles together form one or more bonding matrices and the bonding elements and the filler particles are substantially evenly dispersed therein and bonded together. The plurality of voids are bubble-shaped and/or interconnected channels account for from about 50 vol. % to about 80 vol. % of the aerated composite material. The aerated composite material exhibits a density from about 300 kg/m$^3$ to 1500 kg/m$^3$, a compressive strength from about 2.0 MPa to about 8.5 MPa, and a flexural strength from about 0.4 MPa to about 1.7 MPa.

In another aspect, the invention generally relates to a process for producing an aerated composite material. The process includes: (a) forming a wet mixture, wherein the wet mixture comprises: water, a particulate comprising calcium oxide or silica having a median particle size in the range from about 10 μm to about 1 mm; a ground calcium silicate having a median particle size in the range from about 1 μm to about 100 μm, and an aerating agent, (b) casting the wet mixture in a mold; (c) allowing the aerating agent to generate a gaseous product thereby causing volume expansion of the wet mixture; and (d) curing the expanded mixture at a temperature in the range from about 20° C. to about 100° C. for about 6 hour to about 60 hours under an atmosphere of water and $CO_2$.

In yet another aspect, the invention generally relates to an aerated composite material prepared by a process disclosed herein.

In yet another aspect, the invention generally relates to an article of manufacture made from an aerated composite material disclosed herein.

BRIEF DESCRIPTION OF THE DRAWINGS

FIGS. 1(a)-1(c) are schematic illustrations of cross-sections of bonding elements according to exemplary embodiments of the present invention, including three exemplary core morphologies: (a) fibrous, (b) elliptical, and (c) equiaxed.

DETAILED DESCRIPTION OF THE INVENTION

Figure 2:
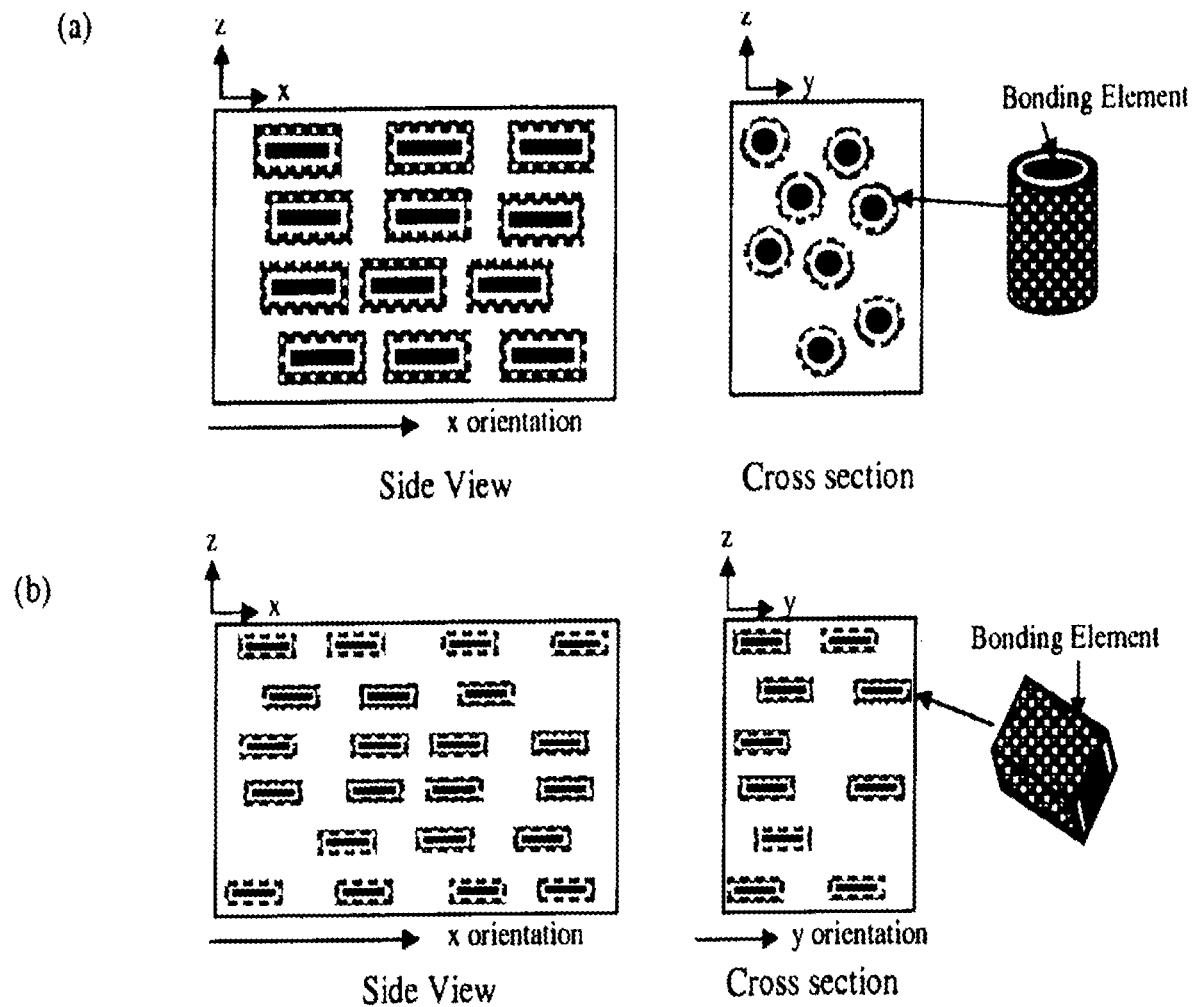
FIGS. 2(a)-2(f) are schematic illustrations of side view and cross section views of composite materials according to exemplary embodiments of the present invention, illustrating (a) 1D oriented fiber-shaped bonding elements in a dilute bonding matrix (bonding elements are not touching), (b) 2D oriented platelet shaped bonding elements in a dilute bonding matrix (bonding elements are not touching), (c) 3D oriented platelet shaped bonding elements in a dilute bonding matrix (bonding elements are not touching), and (d) randomly oriented platelet shaped bonding elements in a dilute bonding matrix (bonding elements are not touching), wherein the composite materials includes the bonding matrix and filler components such as polymers, metals, inorganic particles, aggregates etc., (e) a concentrated bonding matrix (with a volume fraction sufficient to establish a percolation network) of bonding elements where the matrix is 3D oriented, and (f) a concentrated bonding matrix (with a volume fraction sufficient to establish a percolation network) of randomly oriented bonding elements, wherein filler components such as polymers, metals, inorganic particles, aggregates etc. may be included.
Figure 2:
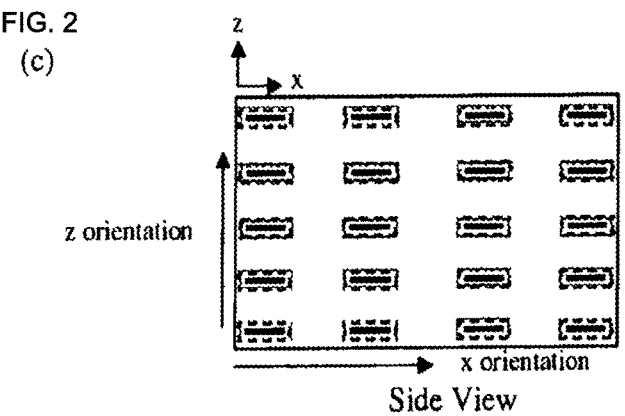
Figure 2:
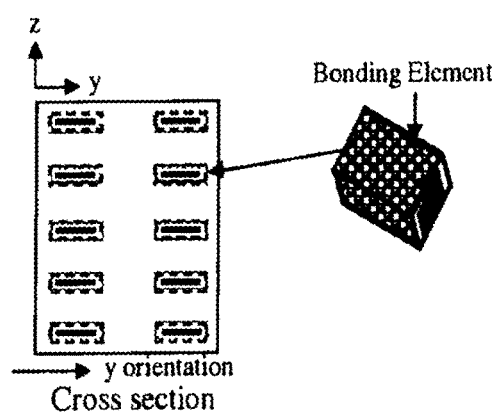
Figure 2:
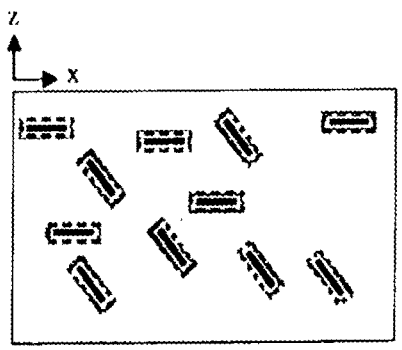
Figure 2:
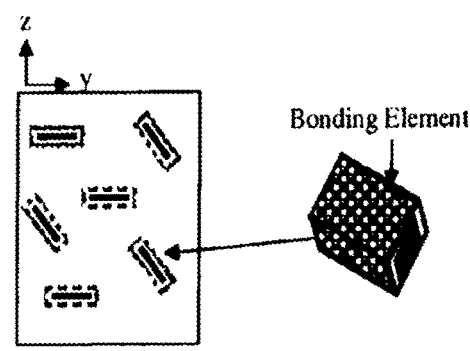
Figure 2:
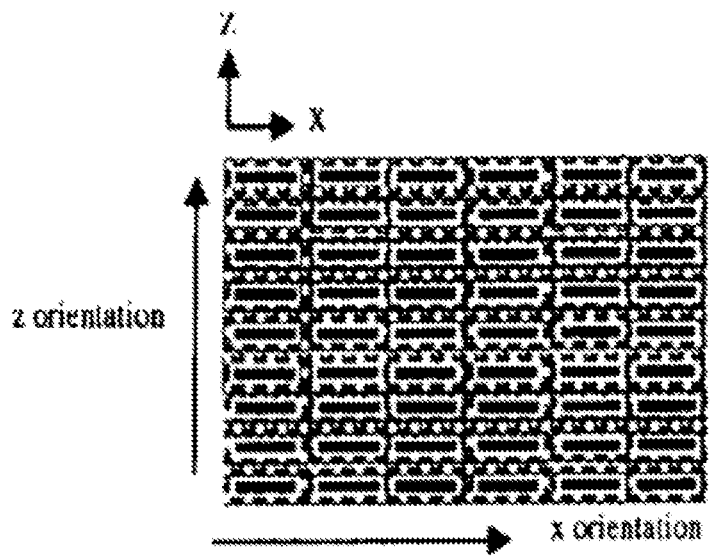
Figure 2:
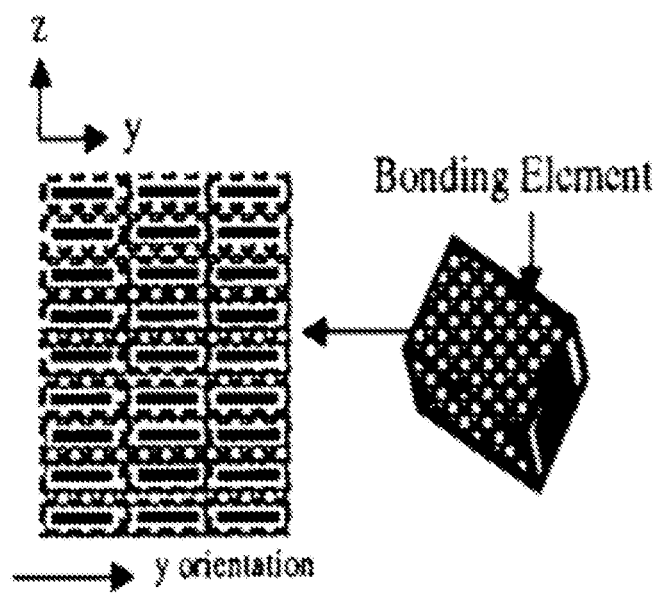
Figure 2:
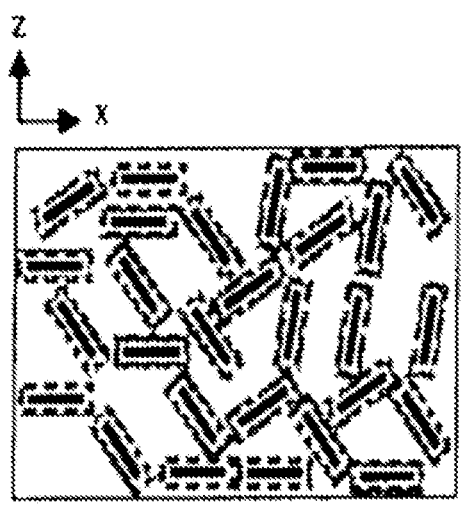
Figure 2:
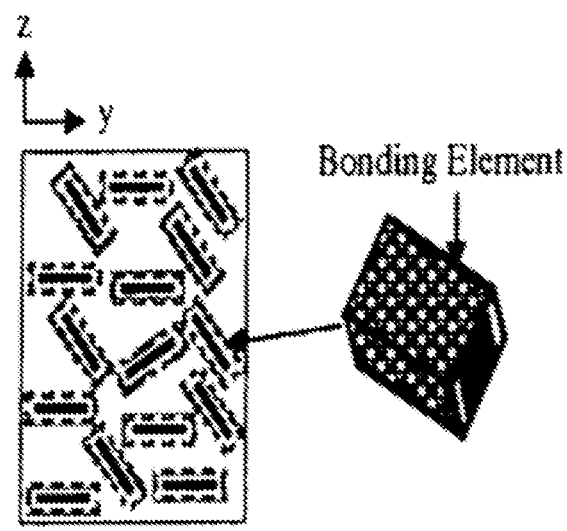

This invention provides novel aerated composite materials and products manufactured therefrom that possess excellent physical and performance properties characteristic of aerated concretes but can be readily produced from widely available, low cost raw materials by a process suitable for large-scale production with improved energy consumption, reduced equipment need (e.g., without the need for autoclaves), and more desirable carbon footprint.

The aerated composite materials of the invention can be used either in load-bearing or non load-bearing applications. The homogeneous nature of their pore structure also imparts superior thermal and acoustic insulation properties compared to conventional aerated concretes. Additionally, the aerated composite materials of the invention can be readily prepared with large dimensions such as a large wall, floor, or roof panels and landscaping blocks.

The aerated composite materials of the invention exhibit excellent insulating qualities (both thermal and sound) as well as fire resistance. They can be produced at large-scales with much improved energy efficiency and more desirable carbon footprint than convention aerated concrete. The production of the aerated composite materials consumes $CO_2$ resulting in $CO_2$ net sequestration thereby making it carbon-neutral and exceptionally efficient from both financial and environmental conservation perspectives. In addition, the solid and homogeneous pore structures of these aerated composite materials create airtight building envelopes, minimizing uncontrolled air changes while helping maintain desired indoor temperatures while maximizing the efficiency of HVAC equipment. Additional benefits brought about by the unique aerated composite materials of the invention are reduction of material use, the ability to use recycled products, and avoidance of toxic emissions.

In one aspect, the invention generally relates to an aerated composite material. The aerated composite material includes: a plurality of bonding elements, a plurality of voids, and a plurality of filler particles having sizes of about 0.1 μm to about 1 mm. Each bonding element is comprised of: a core comprising primarily calcium silicate, a silica-rich first or inner layer, and a calcium carbonate-rich second or outer layer. The plurality of bonding elements and the plurality of filler particles together form one or more bonding matrices and the bonding elements and the filler particles are substantially evenly dispersed therein and bonded together. The plurality of voids are bubble-shaped and/or interconnected channels account for from about 50 vol. % to about 80 vol. % of the composite material. The composite material exhibits a density from about 300 kg/m³ to about 1500 kg/m³, a compressive strength from about 2.0 MPa to about 8.5 MPa, and a flexural strength from about 0.4 MPa to about 1.7 MPa.

Any suitable calcium silicate may be used as a precursor for the bonding elements. As used herein, the term "calcium silicate" refers to naturally-occurring minerals or synthetic materials that are comprised of one or more of a group of calcium-silicon-containing compounds including $CaSiO_3$ (also known as "wollastonite" and pseudo-wollastonite, and sometimes formulated as $CaO.SiO_2$), $Ca_3Si_2O_7$ (also known as Rankinite and sometimes formulated as $3CaO.2SiO_2$), $Ca_2SiO_4$ (also known as "Belite" and sometimes formulated as $2CaO.SiO_2$), $Ca_3SiO_5$ (also known as "Alite" and sometimes formulated as $3CaO.SiO_2$), which material may include one or more other metal ions and oxides (e.g., aluminum, magnesium, iron or manganese oxides), or blends thereof, or may include an amount of magnesium silicate in naturally-occurring or synthetic form(s) ranging from trace amount (1%) to about 50% or more by weight.

It should be understood that, compositions and methods disclosed herein can be adopted to use magnesium silicate in place of or in addition to calcium silicate. As used herein, the term "magnesium silicate" refers to naturally-occurring minerals or synthetic materials that are comprised of one or more of a groups of magnesium-silicon-containing compounds including, for example, $Mg_2SiO_4$ (also known as "Fosterite") and $Mg_3Si_4O_{10}(OH)_2$) (also known as "Talc"), which material may include one or more other metal ions and oxides (e.g., calcium, aluminum, iron or manganese oxides), or blends thereof, or may include an amount of calcium silicate in naturally-occurring or synthetic form(s) ranging from trace amount (1%) to about 50% or more by weight.

The plurality of bonding elements may have any suitable median particle size and size distribution dependent on the desired composite material. In certain embodiments, the plurality of bonding elements have a median particle size in the range of about 5 µm to about 100 µm (e.g., about 5 µm to about 80 µm, about 5 µm to about 60 µm, about 5 µm to about 50 µm, about 5 µm to about 40 µm, about 5 µm to about 30 µm, about 5 µm to about 20 µm, about 5 µm to about 10 µm, about 10 µm to about 80 µm, about 10 µm to about 70 µm, about 10 µm to about 60 µm, about 10 µm to about 50 µm, about 10 µm to about 40 µm, about 10 m to about 30 µm, about 10 µm to about 20 µm).

In certain preferred embodiments, the plurality of bonding elements are chemically transformed from ground wollastonite and the filler particles are lime particles. In certain preferred embodiments, the plurality of bonding elements are chemically transformed from a precursor calcium silicate comprising one or more of aluminum, magnesium and iron. In certain preferred embodiments, wherein the plurality of bonding elements are chemically transformed from a precursor calcium silicate other than wollastonite.

In certain preferred embodiments, the plurality of bonding elements are prepared by chemical transformation from ground wollastonite by reacting it with $CO_2$ via a controlled hydrothermal liquid phase sintering (HLPS) process. In certain preferred embodiments, the plurality of bonding elements are prepared by chemical transformation from the precursor calcium silicate other than wollastonite by reacting it with $CO_2$ via a controlled HLPS process.

Discussions on various aspects of HLPS can be found in U.S. Pat. No. 8,114,367, U.S. Pub. No. US 2011/0104469 (application. Ser. No. 12/984,299), U.S. Pub. No. 20090142578 (application. Ser. No. 12/271,513), WO 2009/102360 (PCT/US2008/083606), WO 2011/053598 (PCT/US2010/054146), WO 2011/090967 (PCT/US2011/021623), U.S. application Ser. No. 13/411,218 filed Mar. 2, 2012 (Riman et al.), U.S. application Ser. No. 13/491,098 filed Jun. 7, 2012 (Riman et al), and Provisional U.S. Appl. Ser. No. 61/708,423 filed Oct. 1, 2012 (Riman et al), each of which is expressly incorporated herein by reference in its entirety for all purposes.

The plurality of voids serve to reduce the overall density of the aerated composite material while at the same time provide a three-dimensional porous network that facilitates uniform and expedited curing of the composite material.

The plurality of voids may account for any suitable fraction of the overall volume of the aerated composite material dependent on the desired properties and applications at hand. For example, the plurality of voids may account for from about 50 vol. % to about 80 vol. % (e.g., about 50%, about 55%, about 60%, about 65%, about 70%, about 75%, about 80%) of the overall volume of the aerated composite material.

The plurality of voids are caused by a gaseous material generated by an aerating agent. In certain preferred embodiments, the aerating agent includes a metal capable of reacting with acid to generate gaseous hydrogen. Exemplary aerating agents include: powder of aluminum, powder of iron, powder of zinc, powder of calcium carbide, and hydrogen peroxide, or a mixture thereof. The aerating agents may have any suitable sizes, for example, ranging from about 10 µm to about 50 µm (e.g., from about 10 µm to 40 µm, from about 10 µm to 30 µm, from about 10 µm to 20 µm, from about 15 µm to 40 µm, from about 15 µm to 30 µm, from about 20 µm to 40 µm, larger than about 40 µm).

Any suitable filler particles may be used, for example, calcium oxide-containing or silica-containing materials. Exemplary filler particles include lime, quartz (including sand), wollastonite, xonotlite, burned oil shale, fly—or volcanic-ash, stack dust from kilns, ground clay, pumice dust. Materials such as industrial waste materials (e.g., fly ash, slag, silica fume) may also be used as fillers. In certain preferred embodiments, light-weight aggregates such as perlite or vermiculite may also be used as fillers. In certain preferred embodiments, filler particles are made from a calcium oxide-rich material such as ground lime.

As used herein, the term "lime" refers to naturally occurring or synthetic inorganic materials in which calcium oxide or calcium hydroxide predominate.

As used herein, The term "quartz", as used herein, refers to any $SiO_2$-based material, including common sands (construction and masonry), as well as glass and recycled glass. The term also includes any other recycled natural and synthetic materials that contain significant amounts of $SiO_2$ (e.g., mica sometimes formulated as $KAl_2(AlSi_3O_{10})$).

The plurality of filler particles may have any suitable median particle size and size distribution. In certain embodiments, the plurality of filler particles has a median particle size in the range from about 0.1 µm to about 1 mm (e.g., about 0.1 µm to about 500 µm, about 0.1 µm to about 250 µm, about 0.1 µm to about 100 µm, about 0.1 µm to about 50 µm, about 0.1 µm to about 1 mm, about 2 µm to about 1 mm, about 10 µm to about 1 mm, about 10 µm to about 500 µm, about 20 µm to about 500 m, about 20 µm to about 300 µm, about 50 µm to about 1 mm, about 100 µm to about 1 mm, about 200 µm to about 1 mm).

The aerated composite material may be prepared to exhibit a desired density and mechanical properties (e.g., meeting or exceeding the specifications of strength classes for Aerated Concrete according to ASTM C1693-11).

TABLE 1

| | ASTM Classifications | | |
| --- | --- | --- | --- |
| Strength Class | Compressive strength psi (MPa) minimum | Nominal Dry Bulk Density kg/m³ Lower limit | Density Limits kg/m³ Upper limit |
| AAC-2 | 290 (2.0) | 350 | 550 |
| AAC-3 | 435 (3.0) | 450 | 650 |
| AAC-4 | 580 (4.0) | 450 | 650 |
| AAC-5 | 725 (5.0) | 550 | 750 |
| AAC-6 | 870 (6.0) | 550 | 750 |

For example, the aerated composite material may be characterized by a density from about 300 kg/m³ to about 1500 kg/m³ (e.g., about 300 kg/m³ to 1200 kg/m³, about 300 kg/m³ to 1000 kg/m³, about 300 kg/m³ to 900 kg/m³, about 400 kg/m³ to 1200 kg/m³, about 400 kg/m³ to 1000 kg/m³, about 400 kg/m³ to 900 kg/m³, about 500 kg/m³ to 1200 kg/m³, about 500 kg/m³ to 1000 kg/m³).

The aerated composite materials of the invention exhibit excellent compressive strength. For example, the aerated composite material may be characterized by a compressive strength from about 2.0 MPa to about 8.5 MPa (e.g., from about 2.0 MPa to about 6.0 MPa, from about 2.0 MPa to about 5.0 MPa, from about 3.0 MPa to about 8.5 MPa, from about 3.0 MPa to about 6.0 MPa, from about 3.0 MPa to about 5.0 MPa, from about 4.0 MPa to about 8.5 MPa).

The aerated composite materials of the invention also exhibit excellent flexural strength. For example, the aerated composite material may be characterized by a flexural strength from about 0.4 MPa to about 1.7 MPa (e.g., from about 0.7 MPa to about 1.7 MPa, from about 1.0 MPa to about 1.7 MPa, from about 1.2 MPa to about 1.7 MPa, from about 1.0 MPa to about 1.5 MPa, from about 1.2 MPa to about 1.5 MPa).

The aerated composite material may further include one or more additives to modify the appearance, physical or mechanical properties of the product. Exemplary additives include rheology modifying admixtures, pigments, retarders, and accelerators.

In certain embodiments, the pigment may be evenly dispersed or substantially unevenly dispersed in the bonding matrices, depending on the desired composite material. The pigment may be any suitable pigment including, for example, oxides of various metals (e.g., black iron oxide, cobalt oxide and chromium oxide). The pigment may be of any color or colors, for example, selected from black, white, blue, gray, pink, green, red, yellow and brown. The pigment may be present in any suitable amount depending on the desired composite material, for example in an amount ranging from about 0.0% to about 10% by weight (e.g., about 0.0% to about 8%, about 0.0% to about 6%, about 0.0% to about 5%, about 0.0% to about 4%, about 0.0% to about 3%, about 0.0% to about 2%, about 0.0% to about 1%, about 0.0% to about 0.5%, about 0.0% to about 0.3%, about 0.0% to about 2%, about 0.0% to about 0.1%).

In certain embodiments, the composite material is characterized by water absorption of less than about 10% (e.g., less than about 8%, 5%, 4%, 3%, 2%, 1%).

In certain embodiments, the plurality of bonding elements have a median particle size in the range from about 5 μm to about 100 μm.

In certain embodiments, the filler particles are calcium-oxide rich materials.

In certain embodiments, the filler particles are selected from lime and quartz.

In certain embodiments, the filler particles are industrial waste materials.

In certain embodiments, the filler particles are fly ash, slag, and silica fume.

In certain embodiments, the plurality of bonding elements are chemically transformed from ground wollastonite and the filler particles are lime particles.

In certain embodiments, the plurality of bonding elements are chemically transformed from a precursor calcium silicate other than wollastonite.

In certain embodiments, the plurality of bonding elements are chemically transformed from a precursor calcium silicate comprising one or more of aluminum, magnesium and iron.

In certain embodiments, the plurality of voids account for from about 50 vol. % to about 80 vol. % of the aerated composite material.

In certain embodiments, the plurality of voids account for from about 65 vol. % to about 80 vol. % of the aerated composite material.

In certain embodiments, the plurality of bonding elements are prepared by chemical transformation from ground wollastonite by reacting it with $CO_2$ via a controlled hydrothermal liquid phase sintering process.

In certain embodiments, the plurality of bonding elements are prepared by chemical transformation from the precursor calcium silicate other than wollastonite by reacting it with $CO_2$ via a controlled hydrothermal liquid phase sintering process.

In certain embodiments, the aerated composite material exhibits a density from about 400 kg/m$^3$ to 1200 kg/m$^3$, a compressive strength from about 2.0 MPa to about 6.0 MPa, and a flexural strength from about 0.66 MPa to about 1.32 MPa.

In certain embodiments, the aerated composite material exhibits a density from about 500 kg/m$^3$ to 1000 kg/m$^3$, a compressive strength from about 2.0 MPa to about 6.0 MPa, and a flexural strength from about 0.88 MPa to about 1.32 MPa.

In certain embodiments, the plurality of voids are caused by gaseous hydrogen produced by reacting an aerating agent with an acid.

In certain embodiments, the aerating agent is a metal capable of reacting with acid to generate hydrogen.

In certain embodiments, the aerating agent is powder of aluminum, iron, zinc, calcium carbide, or a mixture thereof.

In certain embodiments, the aerated composite material further includes an additive selected from rheology modifying admixtures, pigments, retarders, and accelerators.

In certain embodiments, the pigment comprises one or more of black iron oxide, cobalt oxide and chromium oxide.

In another aspect, the invention generally relates to a process for producing an aerated composite material. The process includes: (a) forming a wet mixture, wherein the wet mixture comprises: water, a particulate comprising calcium oxide or silica having a median particle size in the range from about 10 μm to about 1 mm; a ground calcium silicate having a median particle size in the range from about 1 μm to about 100 μm, and an aerating agent, (b) casting the wet mixture in a mold; (c) allowing the aerating agent to generate a gaseous product thereby causing volume expansion of the wet mixture; and (d) curing the expanded mixture at a temperature in the range from about 20° C. to about 100° C. for about 6 hour to about 60 hours under an atmosphere of water and $CO_2$.

In certain preferred embodiments, the step of curing the expanded mixture is performed under a pressure ranging from ambient atmospheric pressure to about 30 psi above ambient and under a $CO_2$ concentration ranging from about 50% to about 99% to produce an aerated composite material.

In certain preferred embodiments, the step of forming a wet mixture includes mixing the following ingredients in the specified order of addition: adding water; adding and mixing ground calcium silicate; adding and mixing the particulate comprising calcium oxide or silica to form a uniform slurry; and adding and mixing the aerating agent.

Curing temperature and time may be adjusted according to the desired end product, for example, at a temperature in the range from about 20° C. to about 100° C. (e.g., from about 20° C. to about 90° C., from about 30° C. to about 90° C., from about 40° C. to about 90° C., from about 40° C. to about 80° C., from about 50° C. to about 70° C., from about 60° C. to about 100° C.) for about 6 hours to about 60 hours (e.g., for about 6 hours to about 60 hours, for about 10 hours to about 60 hours, for about 6 hours to about 40 hours, for about 10 hours to about 40 hours, for about 10 hours to about 30 hours, for about 20 hours to about 30 hours) under an atmosphere of water and $CO_2$.

The relative humidity environment of the curing process may be adjusted to fit the desired outcome, for example, ranging from about 50% to about 98% (e.g., from about 60% to about 98%, from about 70% to about 98%, from about 80% to about 98%, from about 90% to about 98%, from about 50% to about 90%, from about 50% to about 80%, from about 50% to about 70%) and with a $CO_2$ pressure ranging from about ambient atmospheric pressure to about 100 psi above ambient atmospheric pressure (e.g., from about ambient atmospheric pressure to about 90 psi above ambient, from about ambient atmospheric pressure to about 80 psi above ambient, from about ambient atmospheric pressure to about 70 psi above ambient, from about ambient atmospheric pressure to about 60 psi above ambient, from about 20 above ambient to about 100 psi above ambient, from about 30 above ambient to about 100 psi above ambient), and having a $CO_2$ concentration ranging from about 10% to about 90% (e.g., from about 20% to about 90%, from about 30% to about 90%, from about 40% to about 90%, from about 10% to about 70%, from about 10% to about 50%) to produce an aerated composite material exhibiting a uniform, homogeneous, and highly porous structure.

In exemplary productions as in some embodiments of the invention, the materials used are ground calcium silicate that is predominantly ground wollastonite, the particulate calcium oxide is predominantly ground lime, and the aerating agent is aluminum powder.

The ground wollastonite may have a median particle size from about 5 μm to about 50 μm (e.g., about 5 μm, 10 μm, 15 μm, 20 μm, 25 μm, 30 μm, 40 μm, 50 μm), a bulk density from about 0.6 g/mL to about 0.8 g/mL (loose) and about 1.0 g/mL to about 1.2 g/mL (tapped), a surface area from about 1.5 m$^2$/g to about 2.0 m$^2$/g. The first ground limestone has a median particle size from about 40 μm to about 90 μm (e.g., about 40 μm, 50 μm, 60 μm, 70 μm, 80 μm, 30 μm, 90 μm), a bulk density from about 0.7 g/mL to about 0.9 g/mL (loose) and about 1.3 g/mL to about 1.6 g/mL (tapped). The second ground limestone has a median particle size from about 20 μm to about 60 μm (e.g., about 20 μm, 30 μm, 40 μm, 50 μm, 60 μm), a bulk density from about 0.6 g/mL to about 0.8 g/mL (loose) and about 1.1 g/mL to about 1.4 g/mL (tapped).

In certain preferred embodiments, the particulate composition comprises about 10 wt. % to about 95 wt. % of ground wollastonite (e.g., about 20 wt. % to about 95 wt. %, about 30 wt. % to about 95 wt. %, about 50 wt. % to about 95 wt. %, about 60 wt. % to about 95 wt. %, about 20 wt. % to about 90 wt. %, about 20 wt. % to about 80 wt. %, about 20 wt. % to about 70 wt. %, about 30 wt. % to about 80 wt. %, about 50 wt. % to about 80 wt. %), about 5 wt. % to about 25 wt. % of ground lime (e.g., about wt. 5%, about 10 wt. %, about 15 wt. %, about 20 wt. % about 25 wt. %), and about 0.2% wt. % to about 1.5 wt. % of aluminum powder (e.g., about 0.2% to about 1.5%, about 0.2% to about 1.25%, about 0.2% to about 1.0%, about 0.5% to about 1.5%, about 0.5% to about 1.25%, about 0.5% to about 1.0%).

Any suitable precursor materials may be employed. For example calcium silicate particles formed primarily of wollastonite, $CaSiO_3$, can react with carbon dioxide dissolved in water. It is believed that calcium cations are leached from the wollastonite and transform the peripheral portion of the wollastonite core into calcium-deficient wollastonite. As the calcium cations continue to be leached from the peripheral portion of the core, the structure of the peripheral portion eventually become unstable and breaks down, thereby transforming the calcium-deficient wollastonite peripheral portion of the core into a predominantly silica-rich first layer. Meanwhile, a predominantly calcium carbonate second layer precipitates from the water.

More specifically, the first layer and second layer may be formed from the precursor particle according the following reaction (1):

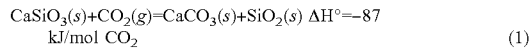

$$CaSiO_3(s) + CO_2(g) = CaCO_3(s) + SiO_2(s) \quad \Delta H° = -87 \text{ kJ/mol } CO_2 \quad (1)$$

For example, in a silicate mineral carbonation reaction such as with wollastonite, $CO_2$ is introduced as a gas phase that dissolves into an infiltration fluid, such as water. The dissolution of $CO_2$ forms acidic carbonic species that results in a decrease of pH in solution. The weakly acidic solution incongruently dissolves calcium species from $CaSiO_3$. The released calcium cations and the dissociated carbonate species lead to the precipitation of insoluble carbonates. Silica-rich layers are thought to remain on the mineral particles as depletion layers.

Thus, according to a preferred embodiment of the invention, $CO_2$ preferentially reacts with the calcium cations of the wollastonite precursor core, thereby transforming the peripheral portion of the precursor core into a silica-rich first layer and a calcium carbonate-rich second layer. Also, the presence of the first and second layers on the core act as a barrier to further reaction between wollastonite and carbon dioxide, resulting in the bonding element having the core, first layer and second layer.

Preferably, gas-assisted HLPS processes utilize partially infiltrated pore space so as to enable gaseous diffusion to rapidly infiltrate the porous preform and saturate thin liquid interfacial solvent films in the pores with dissolved $CO_2$. $CO_2$-based species have low solubility in pure water (1.5 g/L at 25° C., 1 atm.). Thus, a substantial quantity of $CO_2$ must be continuously supplied to and distributed throughout the porous preform to enable significant carbonate conversion. Utilizing gas phase diffusion offers a huge (about 100-fold) increase in diffusion length over that of diffusing soluble $CO_2$ an equivalent time in a liquid phase. ("Handbook of chemistry and physics", Editor. D. R. Lide, Chapters 6 and 8, 87$^{th}$ Edition 2006-2007, CRC.) This partially infiltrated state enables the reaction to proceed to a high degree of carbonation in a fixed period of time.

Liquid water in the pores speeds up the reaction rate because it is essential for ionization of both carbonic acid and calcium species. However, water levels need to be low enough such that $CO_2$ gas can diffuse into the porous matrix prior to dissolution in the pore-bound water phase. Furthermore, the actively dissolving porous preform serves as a template for expansive reactive crystal growth. Thus, the bonding element and matrices can be formed with minimal distortion and residual stresses. This enables large and complex shapes to result, such as those needed for infrastructure and building materials, in addition to many other applications.

Thus, various combinations of curing conditions may be devised to achieve the desired production process, including varied reaction temperatures, pressures and lengths of reaction. In a first exemplary embodiment, water is delivered to the precursor materials in liquid form with $CO_2$ dissolved therein and the curing process is conducted at about 90° C. and about 20 psig (i.e., 20 psi above ambient pressure) for about 48 hours. In a second exemplary embodiment, water is present in the precursor material (e.g., as residual water from prior mixing step) and water vapor is provided to precursor materials (e.g., to maintain water level and/or prevent loss of water from evaporating) along with $CO_2$ and the curing process is performed at about 60° C. and 0 psig (at ambient atmospheric pressure) for about 19 hours. In a third exemplary embodiment, water is delivered to precursor materials in vapor form along with $CO_2$ and the curing process is performed at about 90° C. and 20 psig (20 psi above ambient atmospheric pressure) for about 19 hours.

In certain embodiments, curing the expanded mixture is performed under a pressure ranging from ambient atmospheric pressure to about 30 psi above ambient and under a $CO_2$ concentration ranging from about 50% to about 99% to produce an aerated composite material.

In certain embodiments, forming a wet mixture includes mixing the following ingredients in the specified order of addition: adding a first portion of water; adding and mixing the particulate comprising calcium oxide or silica to form a uniform slurry; adding and mixing ground calcium silicate; adding and mixing a second portion of water, and adding and mixing the aerating agent.

In certain embodiments, the first portion of water accounts for about 60% to about 95% of and the second portion of water accounts for about 5% to about 40% of total water content in the wet mixture.

In certain embodiments, the first portion of water accounts for about 90% of and the second portion of water accounts for about 10% of total water content in the wet mixture.

In certain embodiments, the wet mixture further comprises an additive selected from rheology modifying admixtures, pigments, retarders, and accelerators.

In certain embodiments, curing the expanded mixture is performed at a temperature in the range from about 20° C. to about 80° C. for about 5 hours to about 40 hours under a vapor comprising water and $CO_2$ and having a pressure in the range from about ambient atmospheric pressure to about 30 psi above ambient atmospheric pressure.

In certain embodiments, curing the casted mixture is performed at a temperature in the range from about 30° C. to about 70° C. for about 10 hours to about 30 hours under a vapor comprising water and $CO_2$ and having a pressure in the range from about ambient atmospheric pressure to about 60 psi above ambient atmospheric pressure.

In certain embodiments, the ground calcium silicate is selected from wollastonite, pseudo-wollastonite, rankanite, belite, and alite.

In certain embodiments, the particulate calcium oxide is selected from lime and wollastonite.

In certain embodiments, the aerating agent is selected from aluminum, iron, zinc, calcium carbide in powder form.

In certain embodiments, the aerating agent is hydrogen peroxide in liquid form.

In certain embodiments, the ground calcium silicate comprises ground wollastonite, the particulate calcium oxide comprises ground lime, and the aerating agent comprises aluminum powder.

In certain embodiments, the particulate composition comprises about 83.5 wt. % to about 94.8 wt. % of ground wollastonite, about 5 wt. % to about 15 wt. % w/w of ground lime, and about 0.2 wt. % to about 1.5 wt. % of aluminum powder.

In yet another aspect, the invention generally relates to an aerated composite material prepared by a process disclosed herein.

In certain embodiments, the aerated composite material exhibits a density from about 300 kg/m$^3$ to 1500 kg/m$^3$, a compressive strength from about 2.0 MPa to about 8.5 MPa, and a flexural strength from about 0.4 MPa to about 1.7 MPa.

In yet another aspect, the invention generally relates to an article of manufacture made from an aerated composite material disclosed herein.

Aerated composite materials of the invention may be used to manufacture a wide range of products of various sizes and dimensions including, for example, standard blocks, cored blocks, cladding blocks, shaftwall and fire blocks, lintel blocks, tongue and groove blocks, wall panels, floor panels, roof panels, plates, sidings, frames, fences, decorative and landscaping products, parking stops, etc. The variety of products can be produced from widely available, low cost raw materials by a process that does not require autoclaves and is suitable for continuous, large-scale production. The production methods are much improved over conventional aerated concretes in terms of both economics and environmental impact.

Bonding Elements, Bonding Matrices and Composite Materials

A. Bonding Elements

As schematically illustrated in FIGS. 1(a)-1(c), a bonding element includes a core (represented by the black inner portion), a first layer (represented by the white middle portion) and a second or encapsulating layer (represented by the outer portion). The first layer may include only one layer or multiple sub-layers and may completely or partially cover the core. The first layer may exist in a crystalline phase, an amorphous phase or a mixture thereof, and may be in a continuous phase or as discrete particles. The second layer may include only one layer or multiple sub-layers and may also completely or partially cover the first layer. The second layer may include a plurality of particles or may be of a continuous phase, with minimal discrete particles.

A bonding element may exhibit any size and any regular or irregular, solid or hollow morphology depending on the intended application. Exemplary morphologies include: cubes, cuboids, prisms, discs, pyramids, polyhedrons or multifaceted particles, cylinders, spheres, cones, rings, tubes, crescents, needles, fibers, filaments, flakes, spheres, sub-spheres, beads, grapes, granulars, oblongs, rods, ripples, etc.

In general, as discussed in greater detail herein, a bonding element is produced from reactive precursor materials (e.g., precursor particles) through a transformation process. The precursor particles may have any size and shape as long as they meet the needs of the intended application. The transformation process generally leads to the corresponding bonding elements having similar sizes and shapes of the precursor particles.

Precursor particles can be selected from any suitable material that can undergo suitable transformation to form the desired bonding elements. For example, the precursor particles may include oxides and non-oxides of silicon, titanium, aluminum, phosphorus, vanadium, tungsten, molybdenum, gallium, manganese, zirconium, germanium, copper, niobium, cobalt, lead, iron, indium, arsenic, tantalum, and/or alkaline earth elements (beryllium, magnesium, calcium, strontium, barium and radium).

Exemplary precursor materials include oxides such as silicates, titanates, aluminates, phosphates, vanadates, tungstates, molybdates, gallates, manganates, zirconates, germinates, cuprates, stannates, hafnates, chromates, niobates, cobaltates, plumbates, ferrites, indates, arsenates, tantalates and combinations thereof. In some embodiments, the precursor particles include silicates such as orthosilicates, sorosilicates, cyclosilicates, inosilicates, phyllosilicates, tectosilicates and/or calcium silicate hydrate.

Certain waste materials may be used as the precursor particles for some applications. Waste materials may include, for example, minerals, industrial waste, or an industrial chemical material. Some exemplary waste materials include mineral silicate, iron ore, periclase, gypsum, iron (II) hydroxide, fly ash, bottom ash, slag, glass, oil shells, red mud, battery waste, recycled concrete, mine tailings, paper ash, or salts from concentrated reverse osmosis brine.

Additional precursor particles may include different types of rock containing minerals such as cal-silicate rock, fitch formation, hebron gneiss, layered gneiss, middle member, argillite, quartzite, intermediate Precambrian sediments, dark-colored, feldpathic quartzite with minor limestone beds, high-grade metasedimentry biotite schist, biotite gniss, mica schist, quartzite, hoosac formation, partridge formation, Washington gneiss, Devonian, Silurian greenvale cove formation, ocoee supergroup, metasandstone, metagraywacke, Rangeley formation, amphibolites, calcitic and dolomite marble, manhattan formation, rusty and gray biotite-quartz-feldspar gneiss, and waterford group.

Precursor particles may also include igneous rocks such as, andesite, anorthosite, basinite, boninite, carbonatite and charnockite, sedimentary materials such as, but not limited to, argillite, arkose, breccias, cataclasite, chalk, claystone, chert, flint, gitsone, lighine, limestone, mudstone, sandstone, shale, and siltsone, metamorphic materials such as, but not limited to, amphibolites, epidiorite, gneiss, granulite, greenstone, hornfels, marble, pelite, phyllite, quartzite, shist, skarn, slate, talc carbonate, and soapstone, and other varieties of rocks such as, but not limited to, adamellite, appinite, aphanites, borolanite, blue granite, epidosite, felsites, flint, ganister, ijolite, jadeitite, jasproid, kenyte, vogesite, larvikite, litchfieldite, luxullianite, mangerite, minette, novaculite, pyrolite, rapakivi granite, rhomb porphyry, shonkinite, taconite, teschenite, theralite, and variolite.

Table 2 provides exemplary embodiments of different types of chemistries for the first and second layers that can be achieved when using different precursor materials. Regarding the first layer, by using different precursor materials one may obtain silica, alumina or titania. The second layer may also be modified with the selection of the precursor material. For example, the second layer may include various types of carbonates such as, pure carbonates, multiple cations carbonates, carbonates with water or an OH group, layered carbonates with either water or an OH group, anion containing carbonates, silicate containing carbonates, and carbonate-bearing minerals.

TABLE 2

Exemplary Precursors and Encapsulating layers

| Raw Material (Precursor) | First Layer | Encapsulating Layer |
|---|---|---|
| Wollastonite ($CaSiO_3$) | Silica-rich | $CaCO_3$ |
| Fosterite ($Mg_2SiO_4$) | | $MgCO_3$ |
| Diopside ($CaMgSi_2O_6$) | | $(Ca, Mg)CO_3$ |
| Talc ($Mg_3Si_4O_{10}(OH)_2$) | | $MgCO_3 \cdot xH_2O$ (x = 1-5) |
| Glaucophane | Alumina | $MgCO_3$ and/or |
| ($Na_2Mg_3Al_2Si_8O_{22}(OH)_2$) | and/or | $NaAlCO_3(OH)_2$ |

TABLE 2-continued

Exemplary Precursors and Encapsulating layers

| Raw Material (Precursor) | First Layer | Encapsulating Layer |
|---|---|---|
| Palygorskite (($Mg, Al)_2Si_4O_{10}(OH) \cdot 4(H_2O)$) | Silica-rich | $Mg_6Al_2CO_3(OH)_{16}4H_2O$ |
| Meionite ($Ca_4(Al_2Si_2O_8)_3(Cl_2CO_3, SO_4)$) | | $Ca_2SO_4CO_3 \cdot 4H_2O$ |
| Tanzanite ($Ca_2Al_3O(SiO_4)(Si_2O_7)(OH)$) | | $Ca_5Si_2O_8CO_3$ and/or $Ca_5Si_2O_8CO_3$ and/or $Ca_7Si_6O_{18}CO_3 \cdot 2H_2O$ |
| ($Ba_{0.6}Sr_{0.3}Ca_{0.1})TiO_3$ | Titania-rich | $Sr(Sr, Ca, Ba)(CO_3)_2$ |

The second layer may be modified by introducing additional anions and/or cations. Such additional anions and cations may be used to modify the second layer to increase its physical and chemical properties such as fire resistance or acid resistance. For example, as shown in Table 3, while the first layer is retained as a silica-rich layer, the second layer may be modified by adding extra anions or cations to the reaction, such as $PO_4^{2-}$ and $SO_4^{2-}$. As a result, the second layer may include, for example, different phosphate, sulphate, fluoride or combinations thereof.

TABLE 3

Examples of Cation/Anion Sources (in addition to $CO_3^{2-}$)

| Core Particle | First Layer | Extra anion/cation source | Encapsulating Layer | Carbonate Type |
|---|---|---|---|---|
| $CaSiO_3$ | Silica-rich layer | Phosphates | $Ca_5(PO_4, CO_3)_3OH$ | Phosphate bearing carbonates |
| | | Sulphates | $Ca_2SO_4CO_3 \cdot 4H_2O$ | Sulphate bearing carbonates |
| | | Fluorides | $Ca_2CO_3F_2$ | Fluorides bearing carbonates |
| | | Phosphates and fluorides | $Ca_5(PO_4, CO_3)_3F$ | Fluoride and phosphates bearing carbonates |
| | | $Mg^{+2}$ source like chlorides, nitrates, hydroxides etc. | $CaMg(CO_3)_2$ | Multiple cation carbonates |
| | | A combination of cation and anion sources | $Ca_6Mg_2(SO_4)_2(CO_3)_2Cl_4(OH)_4 \cdot 7H_2O$ | Post-1992 Carbonate-Bearing Minerals |

B. Bonding Matrix and Composite Material

A bonding matrix comprises a plurality of bonding elements, forming a three-dimensional network. The bonding matrix may be porous or non-porous. The degree of porosity depends on a number of variables that can be used to control porosity, such as temperature, reactor design, the precursor material and the amount of liquid that is introduced during the transformation process. Depending on the intended application, the porosity can be set to almost any degree of porosity from about 1 vol. % to about 99 vol. %.

The bonding matrix may incorporate one or more filler materials, which are mixed with the precursor materials prior to or during the transformation process to create the composite material. The concentration of bonding elements in the bonding matrix may vary. For example, the concentration of bonding elements on a volume basis may be relatively high, wherein at least some of the bonding elements are in contact with one another. This situation may arise if filler material is incorporated into the bonding matrix, but the type of filler material and/or the amount of filler material is such that the level of volumetric dilution of the bonding element is relatively low. In another example, the concentration of bonding elements on a volume basis may be relatively low, wherein the bonding elements are more widely dispersed within the bonding matrix such that few, if any of the bonding elements are in contact with one another. This situation may arise if filler material is incorporated into the bonding matrix, and the type of filler material and/or the amount of filler material is such that the level of dilution is relatively high.

In general, the filler material may include any one of a number of types of materials that can be incorporated into the bonding matrix. A filler material may be inert or active. An inert material does not go through any chemical reaction during the transformation and does not act as a nucleation site, although it may physically or mechanically interact with the bonding matrix. The inert material may involve polymers, metals, inorganic particles, aggregates, and the like. Specific examples may include, but are not limited to basalt, granite, recycled PVC, rubber, metal particles, alumina particle, zirconia particles, carbon-particles, carpet particles, Kevlar™ particles and combinations thereof. An active material chemically reacts with the bonding matrix during the transformation go through any chemical reaction during the transformation and/or acts as a nucleation site. For example, magnesium hydroxide may be used as a filler material and may chemically react with a dissolving calcium component phase from the bonding matrix to form magnesium calcium carbonate.

The bonding matrix may occupy almost any percentage of a composite material. Thus, for example, the bonding matrix may occupy about 1 vol. % to about 99 vol. % of the composite material (e.g., the volume fraction of the bonding matrix can be less than or equal to about 90 vol. %, 70 vol. %, 50 vol. %, 40 vol. %, 30 vol. %, 20 vol. %, 10 vol. %). A preferred range for the volume fraction of the bonding matrix is about 8 vol. % to about 90 vol. % (e.g., about 8 vol. % to about 80 vol. %, about 8 vol. % to about 70 vol. %, about 8 vol. % to about 50 vol. %, about 8 vol. % to about 40 vol. %), and more preferred range of about 8 vol. % to 30 vol. %.

A composite material may also be porous or non-porous. The degree of porosity depends on a number of variables that can be used to control porosity, such as temperature, reactor design, the precursor material, the amount of liquid that is introduced during the transformation process and whether any filler is employed. Depending on the intended application, the porosity can be set to almost any degree of porosity from about 1 vol. % to about 99 vol. % (e.g., less than or equal to about 90 vol. %, 70 vol. %, 50 vol. %, 40 vol. %, 30 vol. %, 20 vol. %, 10 vol. %). A preferred range of porosity for the composite material is about 1 vol. % to about 70 vol. %, more preferably between about 1 vol. % and about 10 vol. % for high density and durability and between about 50 vol. % and about 70 vol. % for lightweight and low thermal conductivity.

Within the bonding matrix, the bonding elements may be positioned, relative to each other, in any one of a number of orientations. FIGS. 2(a)-2(f) schematically illustrate an exemplary bonding matrix that includes fiber- or platelet-shaped bonding elements in different orientations possibly diluted by the incorporation of filler material, as represented by the spacing between the bonding elements. FIG. 2(a), for example, illustrates a bonding matrix that includes fiber-shaped bonding elements aligned in a one-direction ("1-D") orientation (e.g., aligned with respect to the x direction). FIG. 2(b) illustrates a bonding matrix that includes platelet-shaped bonding elements aligned in a two-direction ("2-D") orientation (e.g., aligned with respect to the x and y directions). FIG. 2(c) illustrates a bonding matrix that includes platelet-shaped bonding elements aligned in a three-direction ("3-D") orientation (e.g., aligned with respect to the x, y and z directions). FIG. 2(d) illustrates a bonding matrix that includes platelet-shaped bonding elements in a random orientation, wherein the bonding elements are not aligned with respect to any particular direction. FIG. 2(e) illustrates a bonding matrix that includes a relatively high concentration of platelet-shaped bonding elements that are aligned in a 3-D orientation. FIG. 2(f) illustrates a bonding matrix that includes a relatively low concentration of platelet-shaped bonding elements that are situated in a random orientation (a percolation network). The composite material of FIG. 2(f) achieves the percolation threshold because a large proportion of the bonding elements are touching one another such that a continuous network of contacts are formed from one end of the material to the other end. The percolation threshold is the critical concentration above which bonding elements show long-range connectivity with either an ordered, e.g., FIG. 2(e), or random orientation, e.g., FIG. 2(f), of bonding elements. Examples of connectivity patterns can be found in, for example, Newnham, et al., "Connectivity and piezoelectric-pyroelectric composites", *Mat. Res. Bull.* vol. 13, pp. 525-536, 1978).

Furthermore, one or multi-level repeating hierarchic structure can be achieved in a manner that can promote dense packing, which provides for making a strong material, among other potential useful, functional purposes. Hierarchy describes how structures form patterns on several length scales. Different types of bonding matrices can be created by varying the matrix porosity and by incorporating core fibers of different sizes. Different kinds of particulate and fiber components can be used with hierarchic structures to fabricate different kinds of structures with different connectivity.

Processes of Forming the Bonding Elements, Bonding Matrices and Composite Materials The transformation (curing) process proceeds by exposing the precursor material to a reactive liquid. A reactant associated with the liquid reacts with the chemical ingredients that make up the precursor particles, and more specifically, the chemical reactants in the peripheral portion of the precursor particles. This reaction eventually results in the formation of the first and second layers.

In some embodiments, the precursor particles include two or more chemical elements. During the transformation process, the reactant in the liquid preferentially reacts with at least a first one of the chemical elements, wherein the reaction between the reactant in the liquid (e.g., $CO_2$ and related species in solution) and the at least one first chemical element (e.g., calcium$^{2+}$) results in the formation of the first and second layers, the first layer comprising a derivative of the precursor particle, generally excluding the at least one first chemical element, whereas the second layer comprises a combination (e.g., $CaCO_3$) of the reactant and the at least one first chemical element. In comparison, the core comprises the same or nearly the same chemical composition as the precursor particle (e.g., $CaSiO_3$). For example, peripheral portions of the core may vary from the chemical composition of the precursor particle due to selective leaching of particular chemical elements from the core.

Thus, the core and the second layer share the at least one first chemical element (e.g., calcium$^{2+}$) of the precursor particle, and the core and the first layer share at least another one of the chemical elements of the precursor particle (e.g., $Si^{4+}$). The at least one first chemical element shared by the core and the second layer may be, for example, at least one alkaline earth element (beryllium, magnesium, calcium, strontium, barium and radium). The at least another one of the chemical elements shared by the core and the first layer may be, for example, silicon, titanium, aluminum, phosphorus, vanadium, tungsten, molybdenum, gallium, manganese, zirconium, germanium, copper, niobium, cobalt, lead, iron, indium, arsenic and/or tantalum.

In some embodiments, the reaction between the reactant in the liquid phase and the at least one first chemical element of the precursor particles may be carried out to completion thus resulting in the first layer becoming the core of the bonding element and having a chemical composition that is different from that of the precursor particles, and at least one additional or second shell layer comprising a composition that may or may not include the at least one first chemical element of the two or more chemical elements of the precursor particles.

A. Gas-Assisted Hydrothermal Liquid Phase Sintering

The bonding elements may be formed, for example, by a method based on gas-assisted HLPS. In such a method, a porous solid body including a plurality of precursor particles is exposed to a liquid (solvent), which partially saturates the pores of the porous solid body, meaning that the volume of the pores are partially filled with water.

In certain systems such as those forming carbonate, completely filling the pores with water is believed to be undesirable because the reactive gas is unable to diffuse from the outer surface of the porous solid body to all of the internal pores by gaseous diffusion. Instead, the reactant of the reactive gas would dissolve in the liquid and diffuse in the liquid phase from the outer surface to the internal pores, which is much slower. This liquid-phase diffusion may be suitable for transforming thin porous solid bodies but would be unsuitable for thicker porous solid bodies.

In some embodiments, a gas containing a reactant is introduced into the partially saturated pores of the porous solid body and the reactant is dissolved by the solvent. The dissolved reactant then reacts with the at least first chemical element in the precursor particle to transform the peripheral portion of the precursor particle into the first layer and the second layer. As a result of the reaction, the dissolved reactant is depleted from the solvent. Meanwhile, the gas containing the reactant continues to be introduced into the partially saturated pores to supply additional reactant to the solvent.

As the reaction between the reactant and the at least first chemical element of the precursor particles progresses, the peripheral portion of the precursor particle is transformed into the first layer and the second layer. The presence of the first layer at the periphery of the core eventually hinders further reaction by separating the reactant and the at least first chemical element of the precursor particle, thereby causing the reaction to effectively stop, leaving a bonding element having the core as the unreacted center of the precursor particle, the first layer at a periphery of the core, and a second layer on the first layer.

The resulting bonding element includes the core, the first layer and the second layer, and is generally larger in size than the precursor particle, filling in the surrounding porous regions of the porous solid body and possibly bonding with adjacent materials in the porous solid body. As a result, net-shape formation of products may be formed that have substantially the same size and shape as but a higher density than the porous solid body. This is an advantage over traditionally sintering processes that cause shrinkage from mass transport to produce a higher density material than the initial powder compact.

B. HLPS in an Autoclave

In an exemplary embodiment of the method of HLPS, a porous solid body comprising a plurality of precursor particles is placed in an autoclave chamber and heated. Water as a solvent is introduced into the pores of the porous solid body by vaporizing the water in the chamber. A cooling plate above the porous solid body condenses the evaporated water that then drips onto the porous body and into the pore of the porous solid body, thus partially saturating the pores of the porous solid body. However, the method of introducing water in this example is one of several ways that water can be delivered. For example, the water can also be heated and sprayed.

Meanwhile, carbon dioxide as a reactant is pumped into the chamber, and the carbon dioxide diffuses into the partially saturated pores of the porous body. Once in the pores, the carbon dioxide dissolves in the water, thus allowing the reaction between the precursor particles and the carbon dioxide to transform the peripheral portions of the precursor particles into the first and second layers.

As the reaction between the second reactant and the first layer progresses, the second reactant continues to react with the first layer, transforming the peripheral portion of the first layer into the second layer. The formation of the second layer may be by the exo-solution of a component in the first layer, and such a second layer may be a gradient layer, wherein the concentration of one of the chemical elements (cations) making up the second layer varies from high to low as you move from the core particle surface to the end of the first layer. It is also possible that the second layer can be a gradient composition as well, such as when the layers are either amorphous or made up of solid solutions that have either constant or varying compositions.

The presence of the second layer at the periphery the precursor core eventually hinders further reaction by separating the second reactant and the first layer, causing the reaction to effectively stop, leaving a bonding element having the core, the first layer at a periphery of the core and a second layer on the first layer. The resulting bonding element is generally larger in size than the original precursor particle, thereby filling in the surrounding porous regions of the porous solid body and bonding with adjacent materials of the porous solid body. As a result, the method allows for net-shape formation of products having substantially the same shape as but a higher density than the original porous solid body. This is an advantage over traditional sintering processes that cause shrinkage from mass transport to produce a higher density material than the initial powder compact.

C. Infiltration Medium

The infiltration medium used for transportation into at least a portion of the porous matrix includes a solvent (e.g., water) and a reactive species (e.g., $CO_2$). The solvent can be aqueous or non-aqueous. The solvent can include one or more components. For example, in some embodiments, the solvent can be water and ethanol, ethanol and toluene, or mixtures of various ionic liquids, such as ionic liquids based on alkyl-substituted imidazolium and pyridinium cations, with halide or trihalogenoaluminate anions. Wetting systems are preferred over non-wetting in order to simplify processing equipment.

The solvent should not be chemically reactive with the porous matrix, although the solvent may chemically react with reactive species. The solvent can be removed via a variety of separation methods such as bulk flow, evaporation, sublimation or dissolution with a washing medium, or any other suitable separation method known to one of ordinary skill in the art.

More specifically, the solvent is a liquid at the temperature where the dissolved reactive species react with the porous matrix. This temperature will vary depending on the specific solvent and reactive species chosen. Low temperatures are preferred over higher ones to save energy and simplify processing equipment thereby reducing manufacturing costs.

The role of the solvent contrasts with prior art involving reactive systems, such as, for example, Portland cement, where a solvent such as water reacts with a porous matrix to form products that contain solvent molecules, such as metal hydrates or metal hydroxides, among other precipitation products.

Regardless of the phase of the pure reactive species, the reactive species dissolve in the solvent as neutral, anionic or cationic species. For example, the at least one reactive species can be $CO_2$, which is a gas at room temperature that can dissolve in water as neutral $CO_2$ but can create reactive species such as $H_3O^+$, $HCO_3^-$, $H_2CO_3$ and $CO_3^{2-}$. Regardless of the initial phase of the reactive species and the solvent in the natural state, the infiltration medium is in a liquid phases in the pores (e.g., interstitial spaces) of a porous matrix.

For example, capillary forces can be used to wick the infiltration medium into a porous matrix spontaneously. This type of wetting occurs when the infiltration medium has a very low contact angle (e.g., <90° C.). In this case, the medium can partially fill (partially saturate) or fully fill (saturate) the pores. The infiltration can also take place in such a manner that the some pores are filled while others are empty and/or partially filled. It is also possible that an infiltrated porous matrix with gradients in pore filling or saturation can be later transformed to one that is uniform via capillary flow. In addition, wetting does not spontaneously occur when the contact angle of the infiltration medium is high (e.g., >90°). In such cases, fluids will not infiltrate the porous matrix unless external pressure is applied. This approach has utility when it is desirable to withdraw the infiltration medium by the release of pressure (e.g., a reaction can be initiated or halted by pressure).

When infiltration is done using spontaneous capillary flow in the pores, the bulk flow ceases when the pores are filled (saturated). During HLPS, the reactive species react with the matrix to form one or more products by the various reactions. The at least one reaction species is depleted from inside the pore space and thus need to be replenished during the course of the reaction. When pores are fully saturated with the infiltration medium, the reactive species must be transported from the infiltration medium external to the porous matrix through the matrix pores. In a quiescent fluid, diffusion is the process by which transport takes place. Thus, for some HLPS methods whose reactions inside the pores are fast relative to all other mass transport processes, the reaction becomes limited by large increases in the porous matrix thickness. In such a case, only the outer portion of the matrix reacts extensively with the reactive species, while inner regions of the porous matrix are either less completely reacted or unreacted. These types of reactions are suitable for preparation of gradient microstructures where the concentrations of products of the HLPS process are higher on the outside portion (near external surface regions) versus the interior of the structure.

D. Process Selection and Control

When highly exothermic reactions proceed slowly relative to transport of the infiltration medium and the matrix is thermally insulating, entrapped heat can increase the rate of reaction in the interior of the matrix to enable its interior to contain more product phase (i.e., the product of the reaction between the at least one reactive species and a portion of the porous matrix) than its interior. For HLPS processes where reactions isothermally proceed at an intermediate rate relative to mass transport of the infiltration medium, diffusion can continue to supply the pores with reactive species and no gradient in the degree of reaction (or product concentration) will be observed. In such a case, there is little difference in the chemical and/or phase composition from the interior to the exterior of the material of the monolithic structure or body.

In many cases, a uniform microstructure with respect to phase and composition is desirable in the monolithic structure body. Furthermore, it is also desirable to conduct HLPS reactions ii a relatively short time frame, for example, where large thick monolithic bodies are required for applications such as for roads or bridges. It is desirable to balance the rate of reaction and mass transport for HLPS processes. The strategy for precursor choice and method of introducing the precursors to comprise the infiltration medium is important. The preferred choice of precursors and method of introducing the infiltration medium is at least in part a function of the sample thickness in the thinnest direction, the time scale considered acceptable for the process and the thermodynamic and kinetic constraints needed for the process to be commercially viable, such as temperature, pressure and composition.

Table 4 summarizes the precursor choice and method of introduction strategies. The porous matrix can be directly infiltrated or the porous matrix may be evacuated prior to any of the infiltration sequences described in the Table 4. Methods are described that use gases as precursors, liquids as precursors or solids as precursors. In addition, phase mixtures such as solid and liquids, gases and liquids and gas and solids can all be used. For example, a reactant such as $CO_2$ is a gas in its pure state but is converted to a solution species dissolved into water. Such an event can come about by gaseous diffusion into the porous matrix and subsequent condensation when a pore is encountered. This type of precursor system is relevant when microstructures having carbonate phases are desired. The order of addition of the precursors (solvent and reactive species) can influence the reaction yield and microstructure of the material.

TABLE 4

Precursors and Methods of Introduction for HLPS Processes

| System | Reactive Species | Solvent | Deliquescent Material | Methods of Introduction |
|---|---|---|---|---|
| (1) | Gas | Gas | | Premixing (parallel introduction) two gases and introducing them to a lower temperature to condense one or more gas species in the matrix to comprise an infiltrating solution containing reactive species and solvent or condense the gas mixture in the matrix by cooling the matrix or utilize a porous matrix that possesses Kelvin pores to condense the gas phase in the matrix. |

TABLE 4-continued

Precursors and Methods of Introduction for HLPS Processes

| System | Reactive Species | Solvent | Deliquescent Material | Methods of Introduction |
|---|---|---|---|---|
| | | | | Gases can also be introduced in series where one gas is condensed prior to infiltration or after infiltration and the other is introduced afterwards to dissolve in the liquid phase. The reverse order is possible but the reaction yield could be reduced. |
| (2) | Gas | Gas | Solid | Pre-mixing deliquescent solid with matrix, pre-mix gases (parallel introduction) then flow and/or diffuse the gas mixture through the matrix to form infiltrating solution<br>Gases can be introduced in series into the deliquescent solid-matrix pre-mixture. The preferred order is to have the gas that liquefies the deliquescent solid and then the gas that dissolves to form reactive species. The reverse order is acceptable but the reaction yield could be reduced |
| (3) | Gas | Liquid | Solid | Premixing of deliquescent solid with matrix, then infiltrate with liquid solvent, then add gas (or visa-versa) to form infiltrating solution in matrix pores. Reverse order of gas and liquid is possible but may result in reduced reaction yield<br>or<br>Gas and liquid could be pre-mixed as a solution for introduction into the deliquescent solid-matrix pre-mixture but reaction yield might be reduced |
| (4) | Liquid | Liquid | | Pre-mix (parallel introduction) fluids then infiltrate matrix.<br>or<br>Infiltrate fluids through matrix in series with preferred ordering being liquid solvent prior to liquid that provides reactive species. |
| (5) | Liquid | Liquid | Solid | Premixing of deliquescent solid with matrix, then add liquid solvent to dissolve deliquescent solid, then add liquid reactive species (or visa-versa) to form infiltrating solution.<br>or<br>Pre-mixed solvent and reactive species in liquid phases as an infiltration solution for introduction into the deliquescent solid-matrix pre-mixture |
| (6) | Liquid | Gas | | Infiltrate matrix with gas and condense in matrix as liquid, then infiltrate second liquid into matrix to mix with first liquid in matrix. Reverse order is also possible but not preferred due to possibility of low reaction yield.<br>or<br>Preferred route is premixing of gas and liquid by condensing gas and mixing into second liquid, then introduce solution to a porous matrix |
| (7) | Gas | Liquid | — | Infiltrate liquid then introduce gas or Pre-dissolve gas in liquid then infiltrate |
| (8) | Solid | Solid | | Mix solids with porous matrix, then pressurize or heat to form infiltration liquid. One solid may flux the other to form a liquid phase that can be removed later by washing. Other solids could be added to reduce melting temperature to form liquid phase as long as it can be removed later |
| (9) | Liquid | Solid | | Prepare infiltration solution by dissolving solid in liquid, then infiltrate<br>Or<br>Premix solid with porous matrix, then infiltrate with liquid |
| (10) | Solid | Liquid | | Prepare infiltration solution by dissolving solid in liquid, then infiltrate<br>Or<br>Premix solid with porous matrix, then infiltrate with liquid |

In some embodiments, the solvent and reactive species may be premixed to form the infiltration medium and then introduced into the matrix in a single step. In other embodiments, it may be preferable to employ multiple infiltration sequences. For example, the solvent precursor could be introduced first followed by infiltration of the reactive species or vice versa.

Neither the solvent nor the reactive species precursors need to be the same phase initially as the infiltrating medium will be a liquid that is found in the pores of the matrix. For example, the solvent precursor can be a vapor such as water, which is gaseous at temperatures at 100° C. or higher at atmospheric pressure and can be condensed to a liquid by cooling the matrix to a temperature lower than 100° C. or utilizing surface energy by using porous matrices with pore sizes in the Kelvin pore-size range (less than 100 nm). When the pores are large, the temperature is elevated such that gaseous species cannot be thermally condensed, small amounts of infiltrating solution are needed or other reasons not discussed here, and it may be desirable to form the liquid in the pore using a deliquescent compound. Examples of such compounds include boric acid, iron nitrate, and potassium hydroxide. In this case, a vapor such as water can convert the deliquescent solid phase in the pore to a liquid and crystal growth of the product phase can proceed in the pore. This is particularly useful when liquid infiltration and diffusion limits the thickness of the product made by HLPS. Alternatively, gaseous diffusion can be used to transport species over much large distances to form the infiltration medium required for HLPS inside of the pores of the matrix.

Various additives can be incorporated to improve the HLPS process and the resulting products. Additives can be solids, liquids or gases in their pure state but either soluble in the solvent phase or co-processed (e.g., pre-mixed) with the porous matrix prior to incorporation of the infiltration medium. Examples include nucleation catalysts, nucleation inhibition agents, solvent conditioners (e.g., water softening agents), wetting agents, non-wetting agents, cement or concrete additives, additives for building materials, crystal morphology control additives, crystal growth catalysts, additives that slow down crystal growth, pH buffers, ionic strength adjusters, dispersants, binders, rheological control agents, reaction rate catalysts, electrostatic, steric, electrosteric, polyelectrolyte and Vold-layer dispersants, capping agents, coupling agents and other surface-adsorptive species, acid or base pH modifiers, additives generating gas, liquids or solids (e.g., when heated, pressurized, depressurized, reacted with another species or exposed to any processing variable no listed here), and biological or synthetic components (e.g., serving any of the above functions and/or as a solvent, reactive species or porous matrix).

In some embodiments, a deliquescent solid may be used. The deliquescent solid may be premixed with the porous matrix. Then pre-mixture of the solvent and at least one reactive species can be introduced to the deliquescent solid-porous matrix. The solvent and at least one reactive species in the pre-mixture can be both in the gaseous phase or both in liquid phases. In some embodiments, the solvent may be a liquid and the at least one reactive species may be in a gaseous phase in the pre-mixture or vice versa.

A gas-water vapor stream can be passed over a deliquescent salt in the porous matrix to generate the infiltrating medium in a liquid phase in the interstitial space in the porous matrix. For example, a humid gas-water vapor stream can serve as a solvent for $CO_2$ dissolution and ionization. A large number of salts are known to be deliquescent and can be used suitable for forming liquid solutions from the flow of humid air over the salt surfaces. Selection of the appropriate salt relies on the level of humidity in the air. Some salts can operate at very low relative humidities. Examples of deliquescent slats include $Mg(NO_3)_2$, $CaCl_2$ and NaCl.

Regarding delivery of the infiltration medium, it can be delivered as a bulk solution that spontaneously wets the porous matrix. There are many options for delivery of this solution. First, the porous matrix can be immersed in the liquid. Second the infiltration solution can be sprayed onto the porous matrix. In a quiescent system, when there is a volume of infiltration solution that is greater than the pore volume of the porous matrix, diffusion propagates the reaction by delivering the reactive species to the pore sites.

Alternatively, the fluid can flow (mechanically convected) through the porous matrix by a variety of methods. Methods such as pressurized flow, drying, electro-osmotic flow, magneto-osmosis flow, and temperature- and chemical-gradient-driven flow can be used to flow the liquid infiltration medium through the porous body. This dynamic flow allows fresh reactant to be near the porous matrix, as opposed to relying on diffusional processes. This approach is beneficial as long as the pore size distribution of the matrix permits a reasonably high flow rate of a fluid that supplies reactive species faster than a diffusional process and is optimal when the supply rate equals or exceeds the reaction rate for product formation. In addition, flow-through of the infiltration medium is especially useful for highly exothermic reactions. This is particularly beneficial for monolithic structures that are thick and can generate heat internally capable of generating internal pressures capable of fracturing the monolithic structure.

There are many applications where thicknesses of materials exceed this length scale. In these cases, mechanical convection of the fluid by any suitable means known to one of skill in the art is preferred. An alternative is to introduce the solvent or reactive species as a gaseous species. Also, supercritical conditions can be employed to achieve transport rates that lie between liquids and gases. Gas species may be mechanically convected by applying a pressure gradient across the porous matrix. If the gas is a reactive species, pores filled with solvent fluid can flow out of the pores leaving behind a film of solvent on the pores that can absorb the reactive species gas. Alternatively, partially filled pores will allow gas to flow through the pores as the solvent absorbs a portion of the gas flowing through.

A system may utilize low temperatures and low pressures to enable a low cost process. Thus, processes that retain a fraction of solvent in the pores to facilitate gaseous diffusion of reactive species are preferred over those that utilize quiescent fluids for reactions where a large fraction of product is desired. There are many apparatus designs that can effectively transport reactant and solvent species to the pores. Some of these designs involve conventional reactor equipment such as filter presses, spray chambers, autoclaves and steamers.

EXAMPLES

Example 1: Aerated Composite Material Made Using Synthetic Wollastonite

Raw Materials

Synthetic Wollastonite (SC-C2), Donghai Golden Resources Industries, Donghai, China; Calcium Oxide, Austin, Tex. (Capitol Brand); Aluminum Powder, Eckrat America Corporation, New Jersey.

TABLE 5

| Mixture Proportions (5 kg batch size) | | |
|---|---|---|
| Solid Components: | 64.94% | |
| Synthetic Wollastonite (SC-C2) | 58.1% | 2.906 kg |
| Lime (Calcium Oxide) | 6.5% | 0.325 kg |
| Aluminum powder (30 microns) | 0.32% | 0.016 kg |
| Liquid Components: | 35.06% | |
| Tap Water | 35.06% | 1.753 kg |

Mixing Procedure

1. Measure and load the liquid component (1.753 kg of tap water as in this example) into a laboratory scale mixer.

2. Measure and load 2.906 kg of the first solid component, which is Synthetic Wollastonite (SC-C2) into the slurry and continue mixing at the same rate for approximately five more minutes.

3. Measure and load 0.325 kg of the second solid component, which is lime (Calcium Oxide) into the mixer and mix the two components at approximately 40 RPM for a duration of five minutes or more until a uniform slurry is formed and the temperature of the mix drops to a near-ambient level.

4. Measure and load 0.016 kg of 30-micron size Aluminum powder (final solid component) into the slurry and continue mixing at a lower rpm rate (30 RPM) for about thirty seconds followed by another thirty seconds of mixing at a higher rpm rate (50 RPM). This creates a wet mixture.

Casting Procedure

1. Lubricate the inner surfaces of each mold(s) using WD-40 or grease to lower the friction between the wet mixture and inner surfaces of the molds as well as to avoid the possibility of the wet mixture sticking to the mold surfaces during de-molding.

2. Scoop out the wet mixture from the mixer and pour it into mold(s) to approximately half the height of the mold. In most cases, no external vibration is required; however, if the mold size is small, then a slight shake or disturbance is required to level the mix.

3. Set-aside the mold containing the wet mixture for approximately 3 to 4 hours to allow for aeration or volume expansion, and to achieve the green strength necessary for de-molding.

4. Remove the four vertical sides of the mold to expose the green, aerated ceramic body.

5. Note: The de-molding time can be varied depending on the constituents of the mixture.

Curing Procedure

The green aerated ceramic body, along with its base plate, was placed inside a 7 ft diameter, 12 ft long, horizontal, curing chamber. The curing chamber was purged with $CO_2$ gas for 12 minutes. The temperature of the curing chamber was then set to 60° C. and hot water at 70° C. was circulated at the bottom of the curing chamber to keep the chamber saturated with water vapor. The specimen inside the curing chamber was then cured or reacted under these conditions for 20 hours leading to a creation of a hardened or cured ceramic body.

The cured specimen was then removed from the curing chamber and the bottom plate was removed. The specimen was then placed in a drying oven and set at 90° C. to remove any residual water. The extent of the reaction was calculated based on the weight gain during the reaction. For the samples prepared using the mixture proportions mentioned in Table 5, the extent of reaction was approximately 40% to approximately 60% assuming a complete reaction of aluminum with the binder and lime.

Figure 3:
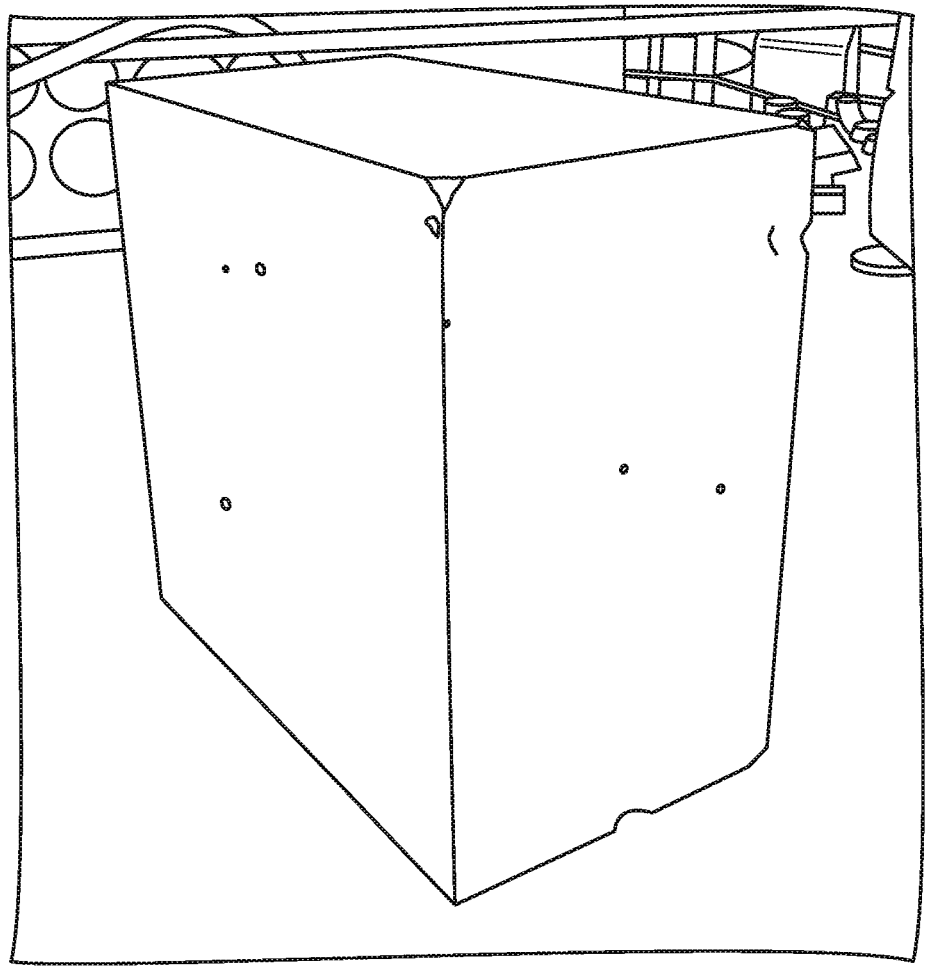
FIG. 3 shows an exemplary photograph of an aerated concrete block prepared according to an embodiment of the present invention.

Photograph:

FIG. 3 shows an example of a cut aerated concrete sample (6 inches×6 inches×4 inches for demonstration purpose) made using synthetic wollastonite.

Density Measurement:

The dry densities of the aerated concretes samples were measured after the samples were oven dried for a period of 24 hours. Cubic specimens of either 2-inches or 4-inches edge lengths were generally preferred for this measurement.

The dry densities of the samples prepared using the mixture proportions mentioned in Table 5 were found to be approximately 650 kg/m$^3$ (40.5 lbs/ft) with a standard deviation of approximately 50 kg/m$^3$ (3.1 lbs/ft$^3$).

Compressive Strength Testing:

Compressive strengths of the cured specimens prepared in their appropriate molds were measured according to ASTM C-1693-11, Section 6. 2-inch or 4-inch cubes specimens were cut from the cured blocks of the aerated concrete samples using a wet-saw.

Compressive strengths of these cubic specimens were measured in either a displacement controlled 150 kN Instron mechanical testing machine at a rate of 0.5 mm/min or using a Gilson universal testing machine at an average rate between 50 and 100 psi/sec. An average of three specimens were tested for compressive strength. The compressive strength of the samples prepared using the mixture proportions mentioned in Table 5 were found to be 720 psi (5 MPa) with a standard deviation of 180 psi (1.3 MPa).

Flexural Strength Testing:

The flexural strength of the cured aerated concrete specimens can be measured according to ASTM C-67, section 6. For this measurement a 150 kN Instron mechanical tester equipped with a 3-point flexural strength rig at a strain rate of 0.5 mm/min is preferred. The ratio of flexural strengths to compressive strength usually varies from 0.22 to 0.27, however, for very low density aerated concretes, this value in most cases could even be zero. The RILEM recommended practice on aerated concrete recommends the estimation of flexural strength (FS) according to the formula: FS=0.27+ 0.21 $f_{ct}$ where FS is the flexural strength and $f_c$ is the compressive strength in MPa.

Figure 4:
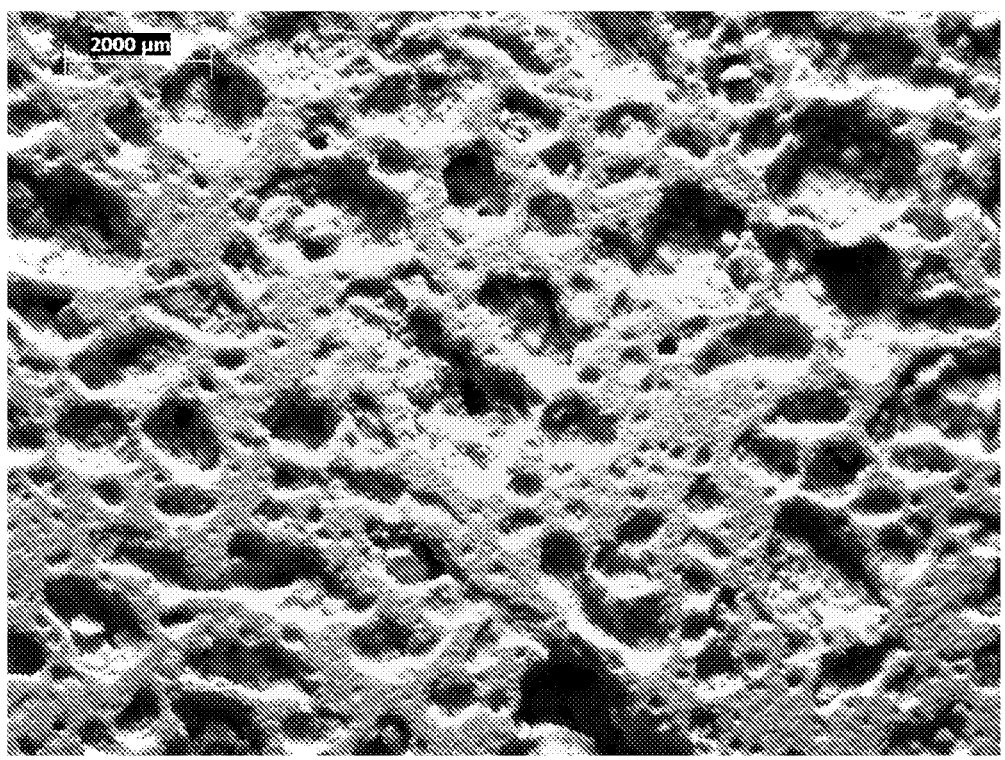
FIG. 4 shows an exemplary magnified photograph of an aerated concrete block, illustrating the discrete pores in the structure, prepared according to the embodiment of the invention.

Microstructure:

The microstructure of aerated concrete samples is a function of the raw materials used for its formulation along with the type of aerating agent used. Some common techniques used to quantify the microstructure include direct measurements, such as optical assessments of porosity and pore size distribution, and indirect measurements, such as the permeability of the porous medium. FIG. 4 is an exemplary magnified photograph, which illustrates the discrete pores in an aerated concrete block. Using this direct measurement, the porosity of the aerated concrete block is estimated to be between 60% and 70%.

A unique aspect of the microstructure of the aerated concrete made using synthetic wollastonite is the fact that the cured or reacted specimens have a different composition, and contain a different binding element, than conventional aerated concrete. Instead of having significant amounts of Tobermorite (which is the phase that gives conventional aerated concrete its mechanical strength) the hardened product mainly consists of calcium carbonate.

Example 2: Aerated Composite Material Made Using Synthetic Wollastonite and Non-Silica Based Aggregate This example specifies the formulation of aerated concrete using non-silica based aggregate materials such as fine limestone filler (with a particle size, $d_{50}$ of 3 microns) as a partial replacement of Synthetic Wollastonite (SC-C2). The amount of replacement can vary from 5% to 65% of synthetic wollastonite depending on the density requirement. The amount of water content or the water-to-solids ratio can also vary based on the replacement level. The mixing, casting, and curing procedures were similar to those mentioned previously. A 60% replacement of synthetic wollastonite by fine limestone filler has shown very dry low densities that vary from 350 kg/m³ to 450 kg/m³ (21.8 lbs/ft³ to 28.1 lbs/ft³).

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

EQUIVALENTS

The representative examples disclosed herein are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples which follow and the references to the scientific and patent literature cited herein. The following examples contain important additional information, exemplification and guidance that can be adapted to the practice of this invention in its various embodiments and equivalents thereof.

What is claimed is:

1. A process for producing an aerated composite material, comprising:
    forming a wet mixture, wherein the wet mixture comprises:
        water,
        a particulate comprising calcium oxide or silica having a median particle size in the range from about 10 μm to about 1 mm;
        a ground calcium silicate having a median particle size in the range from about 1 μm to about 100 μm, and
        an aerating agent,
    casting the wet mixture in a mold;
    providing conditions for generation of a gaseous product from the aerating agent thereby causing volume expansion of the wet mixture; and
    curing the expanded mixture at a temperature in the range from about 20° C. to about 100° C. for about 6 hour to about 60 hours under an atmosphere of water and $CO_2$.

2. The process of claim 1, wherein curing the expanded mixture is performed under a pressure ranging from ambient atmospheric pressure to about 30 psi above ambient and under a $CO_2$ concentration ranging from about 50% to about 99% to produce an aerated composite material.

3. The process of claim 1, wherein forming a wet mixture comprises mixing the following ingredients in the specified order of addition:
    adding water;
    adding and mixing ground calcium silicate;
    adding and mixing the particulate comprising calcium oxide or silica to form a uniform slurry; and
    adding and mixing the aerating agent.

4. The process of claim 1, wherein the wet mixture further comprises an additive selected from rheology modifying admixtures, pigments, retarders, and accelerators.

5. The process of claim 1, wherein curing the expanded mixture is performed at a temperature in the range from about 20° C. to about 80° C. for about 5 hours to about 40 hours under a vapor comprising water and $CO_2$ and having a pressure in the range from about ambient atmospheric pressure to about 30 psi above ambient atmospheric pressure.

6. The process of claim 5, wherein curing the expanded mixture is performed at a temperature in the range from about 30° C. to about 70° C. for about 10 hours to about 30 hours under a vapor comprising water and $CO_2$ and having a pressure in the range from about ambient atmospheric pressure to about 60 psi above ambient atmospheric pressure.

7. The process of claim 1, wherein the ground calcium silicate is selected from wollastonite, pseudo-wollastonite, rankanite, belite, and alite.

8. The process of claim 1, wherein the particulate calcium oxide is selected from lime and wollastonite.

9. The process of claim 1, wherein the aerating agent is selected from aluminum, iron, zinc, calcium carbide in powder form.

* * * * *